July 13, 1937. K. T. STEIK 2,086,582
METHOD OF MANUFACTURING KETENES
Filed Aug. 29, 1930

Inventor
Karl T. Steik
By W. E. Currie Attorney

Patented July 13, 1937

2,086,582

UNITED STATES PATENT OFFICE 2,086,582

METHOD OF MANUFACTURING KETENES

Karl T. Steik, Elizabeth, N. J., assignor to Standard Oil Development Company, a corporation of Delaware Application August 29, 1930, Serial No. 478,618

8 Claims. (Cl. 260—123)

The present invention relates to improvements in the manufacture of organic compounds of the type of acetic ketene ($CH_2:CO$) and its homologs.

The invention will be fully understood from the following description, read in connection with the accompanying drawing, in which Fig. 1 is a diagrammatic view in elevation of equipment suitable for practicing the method;

Figure 1:
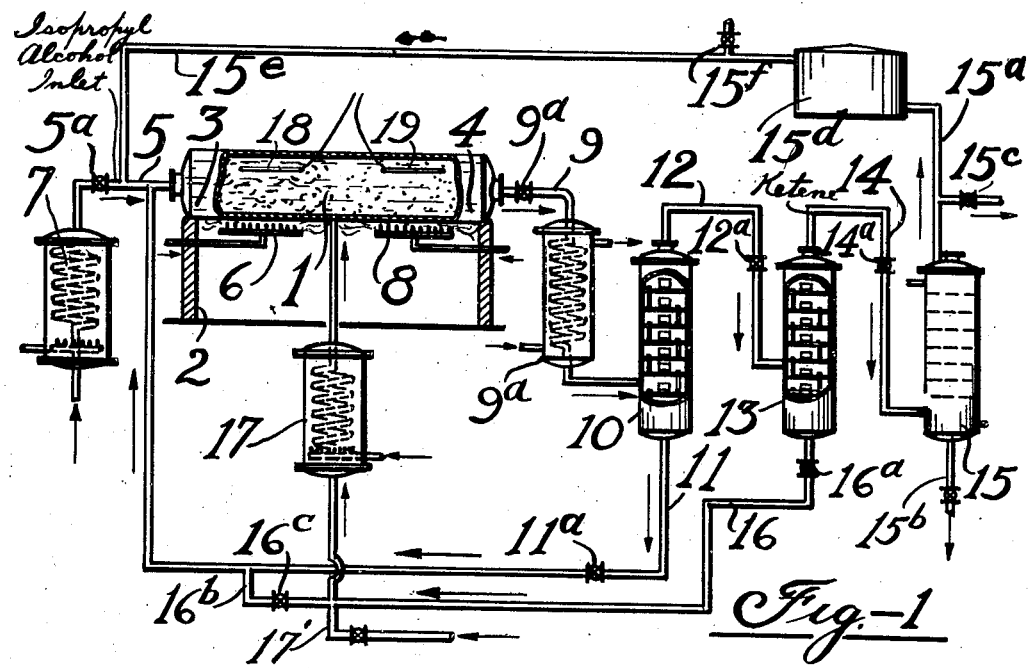

It will be assumed, for facilitating the description, that acetic ketene is to be made from isopropyl alcohol. Referring first to Fig. 1, reference numeral 1 denotes a long reactor or retort, mounted on a support 2. The two ends of the reactor, forming the two extremes of the reaction zone, are designated 3 and 4. A pipe 5 conveys preheated isopropyl alcohol vapor into the lower temperature section 3 of the reactor. Anhydrous alcohol is used unless aqueous addition products are desired, as described further on. Section 3 is packed with a dehydrogenating catalyst, preferably reduced copper, granular zinc oxid, or brass turnings. Air is substantially excluded. Heating means 6 are provided to maintain section 3 at about 400 to 625° C. The isopropyl alcohol may be preheated in a coil 7, if desired.

The reactor is heated in such a manner that the temperature of the gases and vapors therein is progressively increased, say from 400° to 625° C. at the inlet end to about 625° or 850° C. at the outlet end. The reaction tube should be of copper, brass, or similar metal, or it may consist of a steel tube lined with copper, brass, or the like. Decomposition of the isopropyl alcohol to acetone and hydrogen takes place in the inlet portion 3 of the reactor. The outlet portion of the reactor, where decomposition of some of the acetone to ketene and methane occurs may be packed with quartz beads, or the like. It is heated by any suitable means 8.

The pressure in the reaction zone may be substantially atmospheric, but superatmospheric or subatmospheric pressures are not precluded. The rate of flow is dependent on the temperature and is to be determined by practical considerations in connection with recycling, as subsequently described.

The reaction products discharge through line 9 and cooler 9a into a cooled separator 10 maintained at a temperature above the boiling point of acetone but sufficiently low to condense substantially all higher boiling compounds that may be formed by side reactions. A temperature of about 60° C. is satisfactory. Provision for rapid cooling to check any tendency to after-reaction, may be provided, for example as described in connection with Fig. 3. The condensate from separator 10 may be passed, if desired, through line 11 into the isopropyl alcohol inlet line 5. The separator may be of any suitable form, for example a bubble cap tower or the like.

Ketene, unreacted acetone, sometimes with traces of water formed by side reactions, and combined or uncombined, pass from separator 10 through a line 12 into a second separator 13. This is held at a temperature at which acetone is condensed and ketene passes over. Since ketene boils at about minus 56° C. and acetone at plus 56° C., a temperature separation is possible, notwithstanding the solubility of ketene in acetone. Ketene flows through line 14 to a recovery drum or tower 15, preferably containing bubble cap plates or the like, and which has valved vapor and liquid draw-off lines 15a and 15b. Products flowing through line 15a may be discharged through a valved vent line 15c or to a treating tank or tanks 15d. The product from this tank or tanks may be returned to the system through a line 15e, in which there is a vent 15f.

Drum 15 may be charged with cellulose, suspended in acetic acid or other suitable liquid, if it is desired to prepare cellulose acetate, or the drum may be charged with anhydrous alcohols for the manufacture of esters, such as acetates, etc. Ketene is a highly reactive compound and tends to decompose or polymerize on standing. Hence it is desirable to cause it to react as soon as possible after its formation. Due to the high reactivity of ketene, the number of possible reactions is large. Besides those listed above, the following may be mentioned:

Reaction with ammonia to form acetamide.

Reaction with water to form acetic acid, either directly or as a means of concentrating dilute acetic acid.

Reaction with the water content of higher organic acids to fortify their solutions.

Reaction with hydrogen to form acetaldehyde.

Reaction with unsaturated hydrocarbons to form addition products.

Reaction with aniline to give acetanilide.

Reaction with hydrochloric acid to yield acetyl chlorid.

Reaction with various impurities of hydrocarbon oils, especially sulfur compounds such as mercaptans.

Of course, ketene may be recovered as such and this is included in the present invention. However, I prefer to react the ketene as an integral part of the system, either with or without preliminary removal of acetone and other components of the reaction mixture. Instead of a single reaction vessel for the recovery of ketene, any desired number may be provided to insure substantially complete reaction.

The liquid products discharged from separator 13 through line 16 are introduced at the middle or towards the outlet portion of the reactor. A preheater 17 may be provided in this line. The undecomposed alcohol in these products may be separated from the other constituents and sent through by-pass 16b (valve 16c being opened) into the lower temperature zone of the reactor.

The extent of reaction in the outlet portion (4) of the reactor should be controlled within comparatively narrow limits. If the conversion per pass is high, there will ordinarily be objectionable after-reactions destroying part of the ketene produced. I have found that it is usually desirable to hold the conversion per pass below 50%, based on the total quantity of acetone entering the reaction zone. About 5 to 10% conversion per pass in many instances gives the greatest over-all efficiency for the cyclic operation. The degree of dilution with unconverted acetone, or the like, may be regulated as desired to meet special conditions.

Valves 5a, 9a, 11a, 12a, 14a, and 16a are provided in the lines bearing the corresponding numbers, for the control of the system. The temperatures of the inlet and outlet portions of the reactor are determined by pyrometers 18 and 19.

Figure 2:
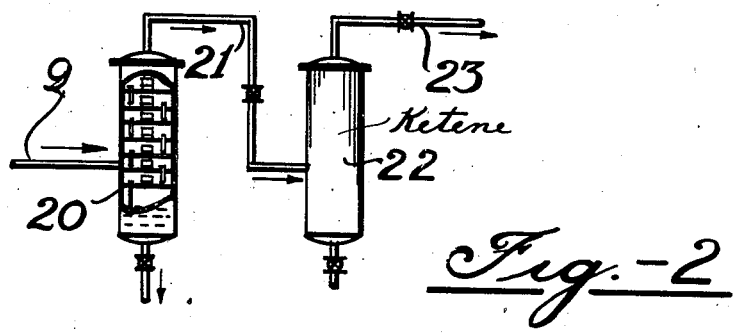
Fig. 2 is a modification of the ketene recovery stage shown in Fig. 1.

In the alternative form shown in Fig. 2, a single separating drum or tower 20 is provided, corresponding to separator 10 of Fig. 1. Ketene and acetone are discharged through line 21 from drum 20 into a ketene recovery drum 22 charged with cellulose or other reactive substances. Acetone and unreacted ketene passing through line 23 are sent back to the reactor through line 17' (Fig. 1).

Figure 3:
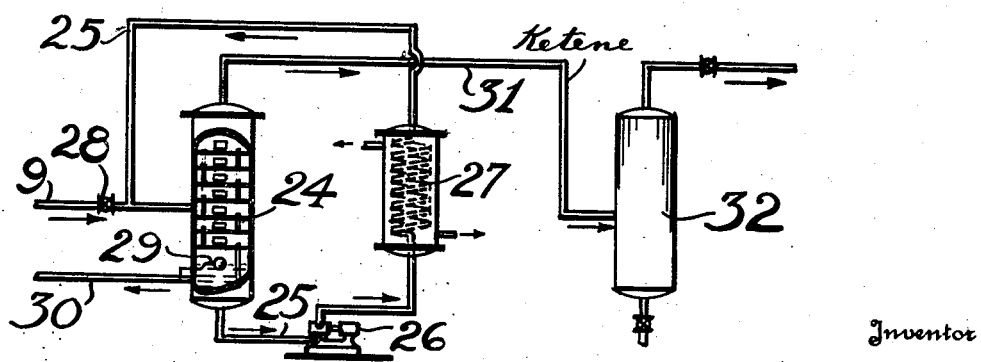
Fig. 3 is another modified form.

In the form of the invention shown in Fig. 3 I provide for the rapid cooling of the reaction product. This is preferably accomplished by injecting into the line 9, which carries the reaction product, a cooling agent which may be the condensate formed from the reaction product. Line 9 discharges into the middle portion of a separator tower 24, which may be provided with the usual bell cap plates or the like. A line 25, in which there is a pump 26 withdraws liquid from the bottom of 24. A cooling coil 27 is inserted in line 25. This line discharges into line 9 and the mixed liquids from the two lines pass into the tower together. Valve 28 is provided in line 9 and may be used to control the pressure.

A float control mechanism 29 holds the desired liquid level in tower 24. Surplus liquid is discharged through line 30.

When operating this equipment for the manufacture of acetic ketene, the reaction product obtained in connection with Fig. 1 is passed into the tower 24 through line 9. The temperature of this tower is maintained at a low point, for example about plus 10 to minus 10° C., by means of the cooling coil 27. Under these conditions most of the ketene will pass out through line 31 into the recovery apparatus 32. The condensate formed in tower 24 comprises acetone and various other constituents of the reaction mixture which are liquids under the conditions of operation, together with some dissolved ketene. It is desirable to return surplus liquid from the tower to the reaction zone.

The invention has been described primarily in connection with acetic ketene but it is applicable also to higher ketenes such as those which are derived from butyl and amyl alcohols and the like, or other ketenizable alcohols, especially the lower secondary alcohols. Ketene may be produced from acetaldehyde by limited dehydrogenation and acetaldehyde may be produced from ethyl alcohol. Accordingly I may substitute ethyl alcohol for isopropyl alcohol in the system described. Instead of anhydrous isopropyl alcohol, the ordinary commercial isopropyl alcohol containing about 12% of water may be used. Some of the ketene will react with the water to form acetic acid or acetic anhydride. When the manufacture of these compounds is the end in view it is desirable to use the aqueous commercial alcohol and the yield of acetic anhydride, or acetic acid may be controlled by adding water.

One of the valuable uses of the present method is in the preparation of esters. It will be observed that an ester may be prepared from an alcohol, using the latter as the only source material. For example, in the operation of the method in connection with an oil refinery, isopropyl alcohol may be manufactured in quantity from the refinery gases. A portion of the alcohol so produced is decomposed to ketene and this is reacted either as such, or through acetic anhydride or acetic acid as an intermediate stage, with another portion of the isopropyl alcohol. The reaction between the alcohol and ketene is very easily effected by merely bubbling the latter through the alcohol, preferably in a series of reaction vessels. A very pure and completely esterified material may be obtained from the first drums of the series.

While we prefer to react the ketene with alcohol in a separate stage for the manufacture of esters, it is possible to form them by reaction of ketene with undecomposed alcohol passing through the conversion tubes.

When converting a ketenizable alcohol such as isopropyl alcohol to acetone, a high yield of acetone is obtained and only a small percentage of the isopropyl alcohol passes on into the higher temperature zone in which ketene is produced. In this zone residual isopropyl alcohol is decomposed at least in part to propylene. Ordinarily, there is not enough of this hydrocarbon to warrant recovery, but in the manufacture of higher ketenes where the conversion of alcohol in the initial stage is not so good, it is desirable to recover the olefins formed in the second stage. These may be sulfated and hydrolyzed to reform the alcohol for return to the system. Equipment for carrying this out is shown diagrammatically in Fig. 1 (15c, 15d and 15e).

The particular form of reactor shown is merely diagrammatic and any suitable type may be used. The waste gases may be burned to heat the reactors.

By the process described it is possible to obtain commercial yields of ketene and related products directly from materials such as alcohol. The invention includes the employment of ketenizable alcohols whether these are of the secondary type, ketenizing through the ketone (or enolic) route, or otherwise. I have found that operation under the conditions defined herein is practical and advantageous notwithstanding the presence of hydrogen and other reaction products resulting from the initial decomposition of the alcohol.

The foregoing description is illustrative of preferred embodiments of the invention but various changes and alternative arrangements may be made within the scope of the appended claims, in which it is my intention to claim all novelty inherent in the invention as broadly as the prior art permits.

I claim:

1. The method of manufacturing ketenes which comprises subjecting organic compounds selected from the group consisting of alcohols and aldehydes and capable of producing ketenes by dehydrogenation and heat, to progressively higher temperatures in stages, without removing intermediate reaction products between stages.

2. The method of manufacturing ketenes which comprises subjecting organic compounds capable of producing ketenes by dehydrogenation and heat, to progressively higher temperatures in stages without removing intermediate reaction products between stages, the first stage being maintained between the approximate temperature limits of 400 and 625° C. and the last stage between the approximate limits of 625 and 850° C.

3. Process according to claim 2, in which a dehydrogenation catalyst is present in the first stage.

4. Process according to claim 2, carried out in a reaction chamber at least lined with a non-ferrous metal having a positive catalytic influence on the reaction.

5. The method of manufacturing ketenes, which comprises subjecting organic compounds capable of producing ketenes by dehydrogenation and heat, to progressively higher temperatures in a first or ketonizing stage in which the organic compounds treated are substantially completely converted into ketones and hydrogen, and a second or ketenizing stage in which the conversion of the ketones formed in the first stage into ketenes is maintained substantially below 50%, without removing intermediate reaction products between stages, and recycling part of the reaction products, other than ketenes, through the second or ketenizing zone.

6. The method of manufacturing ketenes, which comprises subjecting secondary alcohols to progressively higher temperatures in stages, without removing intermediate reaction products between stages.

7. Method according to claim 6, in which isopropyl alcohol is treated and acetic ketene is produced, the temperature in the last stage being maintained between the approximate limits of 625 and 850° C.

8. Method according to claim 6, in which olefin by-products are recovered by treatment with sulfuric acid and subsequent hydrolysis, and the resulting alcohol recycled through the ketene-forming process.

KARL T. STEIK.